(12) United States Patent
Ishikawa

(10) Patent No.: US 11,391,658 B2
(45) Date of Patent: Jul. 19, 2022

(54) AIR BUBBLE MEASUREMENT DEVICE AND AIR BUBBLE MEASUREMENT METHOD

(71) Applicant: SUMITOMO METAL MINING CO., LTD., Tokyo (JP)

(72) Inventor: Shintaro Ishikawa, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 110 days.

(21) Appl. No.: 17/034,834

(22) Filed: Sep. 28, 2020

(65) Prior Publication Data
US 2021/0010917 A1 Jan. 14, 2021

Related U.S. Application Data

(63) Continuation of application No. PCT/JP2019/012751, filed on Mar. 26, 2019.

(30) Foreign Application Priority Data

Mar. 28, 2018 (JP) .................................. 2018-062583
Mar. 28, 2018 (JP) .................................. 2018-062584

(51) Int. Cl.
*G01N 15/02* (2006.01)
*G01N 15/06* (2006.01)

(52) U.S. Cl.
CPC ......... *G01N 15/0205* (2013.01); *G01N 15/06* (2013.01)

(58) Field of Classification Search
CPC . G01N 15/0205; G01N 15/06; G01N 15/1459
See application file for complete search history.

(56) References Cited

U.S. PATENT DOCUMENTS

| 5,152,175 A | 10/1992 | Reynolds |
| 2004/0004716 A1 | 1/2004 | Maliev |

FOREIGN PATENT DOCUMENTS

| CN | 104596898 A | 5/2015 |
| JP | H08-210966 A | 8/1996 |

(Continued)

OTHER PUBLICATIONS

Zhang et al., "Bubble size as a function of some situational variables in mechanical flotation machines", J. Cent. South Univ. 21: pp. 720-727. (Year: 2014).*

(Continued)

*Primary Examiner* — Rebecca C Bryant
(74) *Attorney, Agent, or Firm* — Kratz, Quintos & Hanson, LLP

(57) ABSTRACT

An air bubble measurement device is a device that measures the air bubbles moving in the liquid. The air bubble measurement device includes a measurement chamber that holds a liquid. The measurement chamber includes an introduction port to introduce the air bubbles in the liquid from a lower side and a transparent inclined surface that faces obliquely downward and is disposed at a position to which the air bubbles present inside the liquid move up. The transparent inclined surface includes a hydrophilic membrane. The hydrophilic membrane has a contact angle with water of 20 degrees or less. This structural arrangement allows for reducing an attachment of the air bubbles on the transparent inclined surface even when the air bubbles become small. This allows for reducing stay of the air bubbles on the transparent inclined surface and allows for accurately measuring the states of the air bubbles (that is, the size and quantity of the air bubbles).

11 Claims, 11 Drawing Sheets

(56) References Cited

FOREIGN PATENT DOCUMENTS

| | | | |
|---|---|---|---|
| JP | 2000-121548 A | 4/2000 |
| JP | 2005-532550 A | 10/2005 |
| JP | 2009-300099 A | 12/2009 |
| JP | 2011-033351 A | 2/2011 |

OTHER PUBLICATIONS

International Search Report for International Application No. PCT/JP2019/012751 dated Jun. 25, 2019 (5 sheets, 4 sheets translation, 9 sheets total).
Written Opinion of the International Searching Authority for International Application No. PCT/JP2019/012751 dated Jun. 25, 2019 (8 sheets).
R. Mazahernasab; "Determination of Bubble Size Distribution in a Labratory Mechanical Flotation Cell by a Laser Diffraction Technique"; Physicochemical Problems of Mineral Processing; 2016; pp. 690-702.
J.R. Hernandez-Aguilar; "A technique for the direct measurement of bubble size distributions in industrial flotation cells"; Proceedings 34th Annual Meeting of the Canadian Mineral Processors; Jan. 2002; Paper 24; pp.3-4.

\* cited by examiner

AIR BUBBLE MEASUREMENT DEVICE AND AIR BUBBLE MEASUREMENT METHOD

TECHNICAL FIELD

The present invention relates to an air bubble measurement device and an air bubble measurement method. More specifically, the present invention relates to an air bubble measurement device and an air bubble measurement method that measure size and quantity of air bubbles generated in, for example, a tank constituting a flotation machine.

BACKGROUND ART

A flotation method that has been widely performed in beneficiation that separates a useful metal is a method that attaches particles of a hydrophobic useful metal to air bubbles in an oleaginous solution to separate them from unnecessary minerals. Patent Document 1 discloses an Agitair flotation machine, which is one of the flotation machines.

The flotation machine includes a stirrer in a flotation tank in which a slurry is stored. By introducing air into the slurry and generating air bubbles, a useful metal is attached to the generated air bubbles. It has been desired for efficient flotation to appropriately grasp size and quantity of the generated air bubbles and set the air bubbles in an appropriate state. For example, Non-Patent Document 1 discloses a device to measure states of air bubbles. The air bubble measurement device disclosed in the document includes a glass plate facing obliquely downward, and the air bubbles surfacing in a liquid collide with the glass plate. The state is photographed with a CCD digital camera, and size and quantity of the air bubbles are measured. Since the glass plate with which the air bubbles collide faces obliquely downward, the air bubbles on the part of the glass plate can be photographed. This has effects of facilitating adjustment of a focal point of the camera and ensuring the reduced overlaps of the air bubbles.

Patent Document 1: JP-A-2013-180289

Non-Patent Document 1: J. R. Hernandez-Aguilar, C. O. Gomez, J. A. Finch, "A technique for the direct measurement of bubble size distributions in industrial flotation cells," Proceedings 34" Annual Meeting of the Canadian Mineral Processors, Canada, Jan. 22-24, 2002

DISCLOSURE OF THE INVENTION

Problems to be Solved by the Invention

To enhance the efficiency of beneficiation in the flotation machine, a decrease in size of the air bubbles in the flotation tank has been requested. However, the decrease in size of the air bubbles attaches the air bubbles to the transparent glass plate in the conventional air bubble measurement device, and therefore the air bubbles do not operate upward from the below, thereby causing a problem of failing to correctly grasp the states of the air bubbles in the liquid.

The present invention has been made in consideration of the above-described circumstances, and its objectives is to provide an air bubble measurement device and an air bubble measurement method that ensure correctly grasping states of air bubbles even when a size of the air bubbles in a liquid decreases.

Solutions to the Problems

An air bubble measurement device of a first invention measures air bubbles moving in a liquid. The air bubble measurement device includes a measurement chamber. The measurement chamber holds the liquid. The measurement chamber includes an introduction port to introduce the air bubbles in the liquid from a lower side and a transparent inclined surface that faces obliquely downward and is disposed at a position to which the air bubbles present inside the liquid move up. The transparent inclined surface includes a hydrophilic membrane to reduce attachment of the air bubbles on the transparent inclined surface. The hydrophilic membrane has a contact angle with water of 20 degrees or less.

In an air bubble measurement device of a second invention, which is in the first invention, a member constituting the transparent inclined surface is made of vinyl chloride.

In an air bubble measurement device of a third invention, which is in the first invention or the second invention, the hydrophilic membrane contains titanium oxide.

An air bubble measurement device of a fourth invention measures air bubbles moving in a liquid. The air bubble measurement device includes a measurement chamber. The measurement chamber holds the liquid. The measurement chamber includes an introduction port to introduce the air bubbles in the liquid from a lower side, a transparent inclined surface that faces obliquely downward and is disposed at a position to which the air bubbles present inside the liquid move up, and a first injection port to inject an upward flow forming liquid to generate an upward flow from a lower side to an upper side along the transparent inclined surface. The upward flow forming liquid is same as a liquid filled in the measurement chamber first. The air bubbles move up along the transparent inclined surface together with the upward flow.

In an air bubble measurement device of a fifth invention, which is in the fourth invention, in the measurement chamber, a length in a lateral direction of a measurement portion as a part of the transparent inclined surface is longer than a length in the lateral direction of an inner surface of the introduction port when the transparent inclined surface is viewed from a front.

In an air bubble measurement device of a sixth invention, which is in the fifth invention, when the transparent inclined surface is viewed from the front, a length in the lateral direction of an enlarged communicating portion up to the measurement portion becomes long at a constant proportion from a lower side to an upper side.

In an air bubble measurement device of a seventh invention, which is in any of the fourth invention to the sixth invention, the measurement chamber includes a second injection port to inject an auxiliary flow forming liquid to generate an auxiliary flow from a lower side to an upper side along a surface perpendicular to the transparent inclined surface. The auxiliary flow has a flow speed faster than a flow speed of the upward flow.

An air bubble measurement device of an eighth invention, which is in any of the fourth invention to the seventh invention, includes a light projection device and a photographing device. The light projection device is configured to irradiate the transparent inclined surface with a light. The photographing device is configured to photograph the transparent inclined surface irradiated with the light by the light projection device.

An air bubble measurement method of a ninth invention includes: a liquid introduction step of introducing a liquid in a measurement chamber; an air bubble extracting portion dipping step of dipping an air bubble extracting portion disposed on a lower side of the measurement chamber; an air bubble introduction step of opening the air bubble extracting portion to introduce air bubbles; and an upward flow formation step of injecting an upward flow forming liquid to generate an upward flow along a transparent inclined surface inside the measurement chamber from a first injection port. The upward flow forming liquid is same as a liquid filled in the measurement chamber first.

In an air bubble measurement method of a tenth invention, which is in the ninth invention, the upward flow formation step includes injecting an auxiliary flow forming liquid to generate an auxiliary flow from a lower side to an upper side along a surface perpendicular to the transparent inclined surface from a second injection port when the upward flow forming liquid is injected from the first injection port.

An air bubble measurement method of an eleventh invention, which is in any of the ninth invention or the tenth invention, further includes an air bubble photographing step of irradiating a measurement portion as a part of the transparent inclined surface with a light by a light projection device and photographing the measurement portion by a photographing device.

Effects of the Invention

With the first invention, the hydrophilic membrane having the contact angle with water of 20 degrees or less is disposed on the transparent inclined surface inside the measurement chamber. This allows reducing attachment of the air bubbles on the transparent inclined surface even when the air bubbles become small. This allows reducing stay of the air bubbles on the transparent inclined surface and allows accurately measuring states of the air bubbles, that is, size and quantity of the air bubbles.

With the second invention, the member constituting the transparent inclined surface is made of the vinyl chloride, and therefore it is easy to produce the measurement chamber while ensuring transparency of the transparent inclined surface. In view of this, a manufacturing cost of the air bubble measurement devices can be reduced.

With the third invention, since the hydrophilic membrane contains the titanium oxide, the light irradiated when the state of the air bubbles is photographed provides an effect of a hydrophilic property of a photocatalyst, and thus the attachment of the air bubbles can be reduced.

With the fourth invention, the first injection port to inject the upward flow forming liquid to generate the upward flow from the lower side to the upper side along the transparent inclined surface is disposed. Accordingly, even when the air bubbles become small, the air bubbles can be carried away together with the upward flow, and therefore the states of the air bubbles, that is, the size and quantity of the air bubbles, can be accurately measured.

With the fifth invention, the length in the lateral direction of the measurement portion, which is a part of the transparent inclined surface, is longer than the length in the lateral direction of the inner surface of the introduction port. Accordingly, the air bubbles can disperse in the lateral direction, and this allows avoiding overlaps of the air bubbles and allows further accurately measuring the states of the air bubbles.

With the sixth invention, the length in the lateral direction of the enlarged communicating portion up to the measurement portion becomes long at the constant proportion from the lower side to the upper side. This further facilitates the dispersion of the air bubbles in the lateral direction.

With the seventh invention, the second injection ports to introduce the auxiliary flow forming liquid to generate the auxiliary flow from the lower side to the upper side along the surface perpendicular to the transparent inclined surface are disposed, and the auxiliary flow has the flow speed faster than that of the upward flow. Accordingly, according to the Bernoulli's principle, a pressure around the auxiliary flow where the flow speed is fast becomes lower than a pressure around the upward flow, and the dispersion of the air bubbles in the lateral direction is further facilitated.

With the eighth invention, the light projection device configured to irradiate the measurement portion with the light and the photographing device configured to photograph the measurement portion are provided. This allows accurately recording the states of the air bubbles on the transparent inclined surface, that is, the size and quantity of the air bubbles.

With the ninth invention, the air bubble measurement method including the liquid introduction step, the air bubble introduction step, and the upward flow formation step that injects the upward flow forming liquid from the first injection port allows the air bubbles to be carried away together with the upward flow even when the air bubbles become small, and therefore the states of the air bubbles can be accurately measured.

With the tenth invention, the upward flow injection step including the injection of the auxiliary flow forming liquid to generate the auxiliary flow from the lower side to the upper side along the surface perpendicular to the transparent inclined surface from the second injection ports facilitates the dispersion of the air bubbles in the lateral direction and allows accurately measuring the states of the air bubbles.

With the eleventh invention, the air bubble photographing step that irradiates the light by the light projection device and photographs the measurement portion is further included. This allows accurately recording the states of the air bubbles on the transparent inclined surface, that is, the size and quantity of the air bubbles.

DESCRIPTION OF PREFERRED EMBODIMENTS

Next, embodiments of the present invention will be described based on the drawings. Note that the embodiments described below are to exemplarily describe an air bubble measurement device and an air bubble measurement method for embodying a technical idea of the present invention, and the present invention does not specify the air bubble measurement device to the following the air bubble measurement device. Note that a size, a positional relationship, or the like of members illustrated in each drawing may be exaggerated for a clear explanation. Additionally, in this specification, descriptions indicating the actual "up and down" correspond to up and down on the drawings from FIG. 1 to FIG. 3, from FIG. 6 to FIG. 8, and FIG. 10, and descriptions indicating the actual "left and right" correspond to left and right on the drawings of FIG. 4, FIG. 9, and FIG. 11.

(Basic Configuration of an Air Bubble Measurement Device 10)

Figure 2:
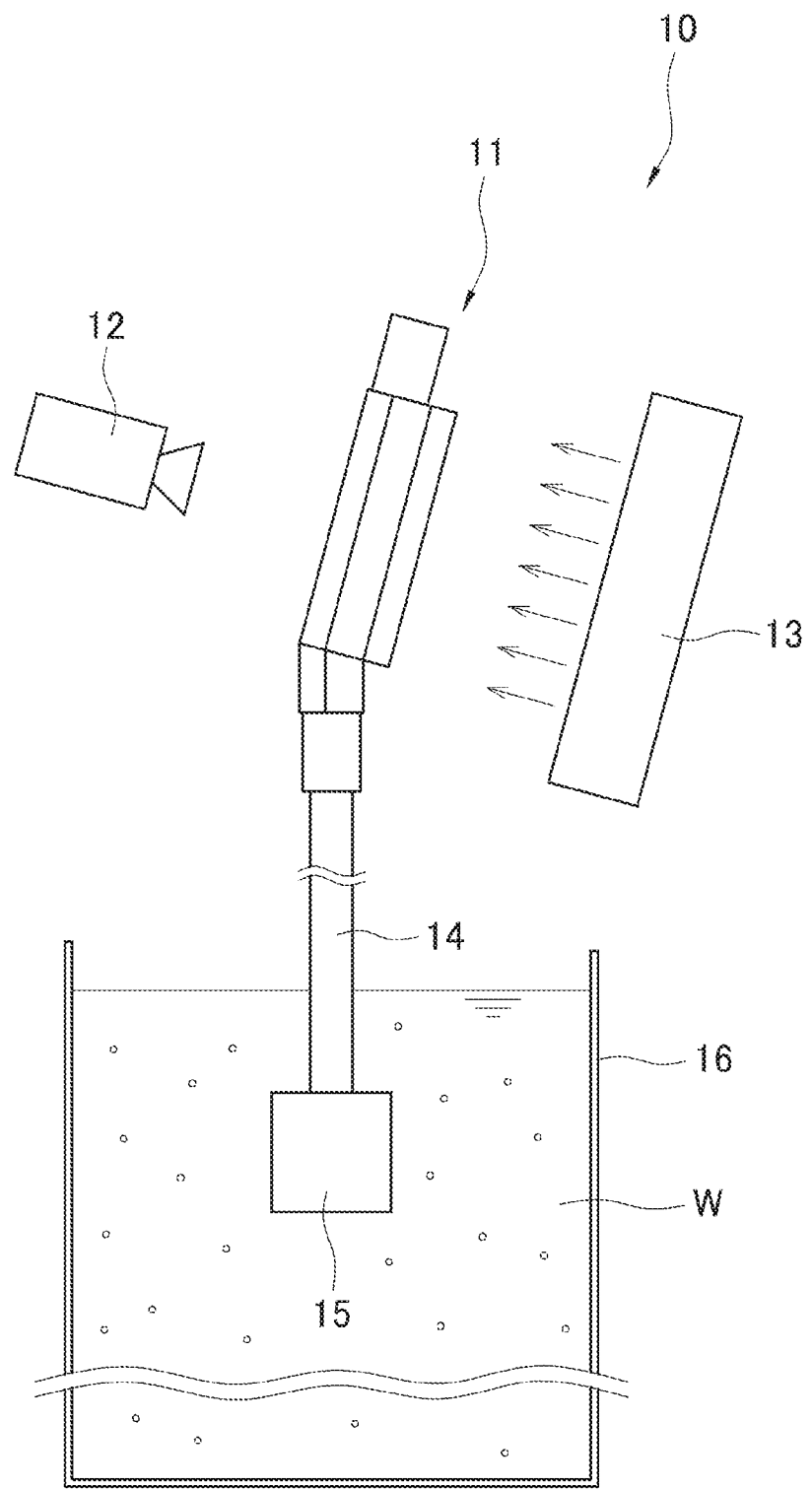
FIG. 2 is a schematic explanatory view of a configuration of the air bubble measurement device according to the first embodiment of the present invention.

FIG. 2 illustrates a schematic explanatory view of the configuration of the air bubble measurement device 10 according to a first embodiment of the present invention. The air bubble measurement device 10 includes at least a measurement chamber 11 described later. For example, the air bubble measurement device 10 is used to measure size and quantity of air bubbles in a liquid W, such as a slurry, used in a flotation tank 16 constituting a flotation machine. The air bubble measurement device 10 preferably includes an air bubble extracting portion 15 to be dipped in the liquid W in the flotation tank 16 and an extension tube 14 that guides the air bubbles in the liquid from the air bubble extracting portion 15 to the measurement chamber 11. Additionally, the air bubble measurement device 10 preferably includes a photographing device 12 configured to visually perceive states of the air bubbles on a measurement portion 23a (see FIG. 3) and a light projection device 13. The light projection device 13 irradiates the measurement portion 23a with a light of a predetermined type from one surface of the measurement chamber 11 (see FIG. 3). For example, a surface illumination, such as a white LED, is preferably used as the light projection device 13. For example, a digital camera configured to photograph at least any of a still image or a moving image is preferably used as the photographing device 12. The size and quantity of the air bubbles photographed by the photographing device 12 are preferably analyzed by software that executes image processing.

First Embodiment

Figure 1:
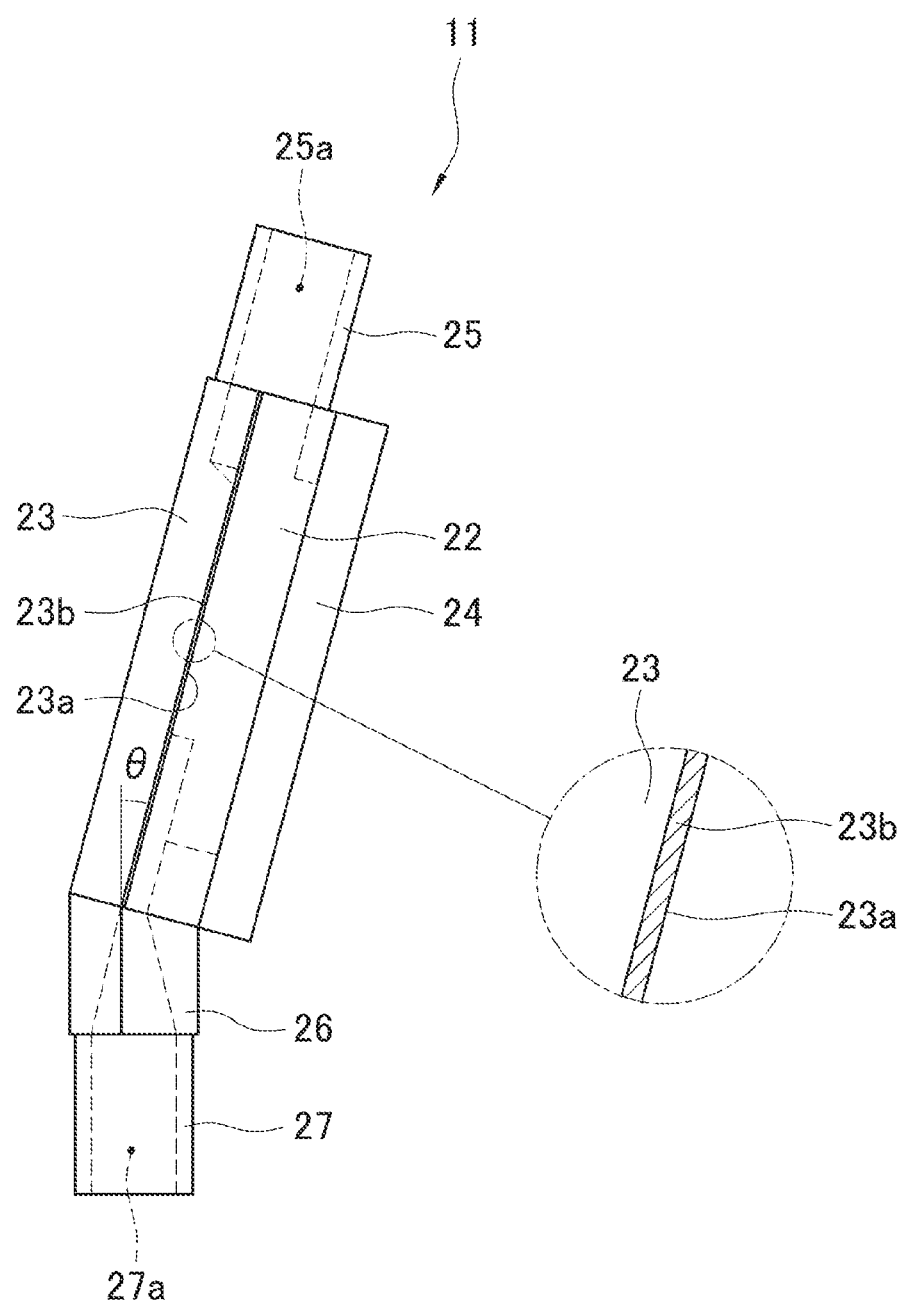
FIG. 1 is a side view of a measurement chamber constituting an air bubble measurement device according to a first embodiment of the present invention.
Figure 3:
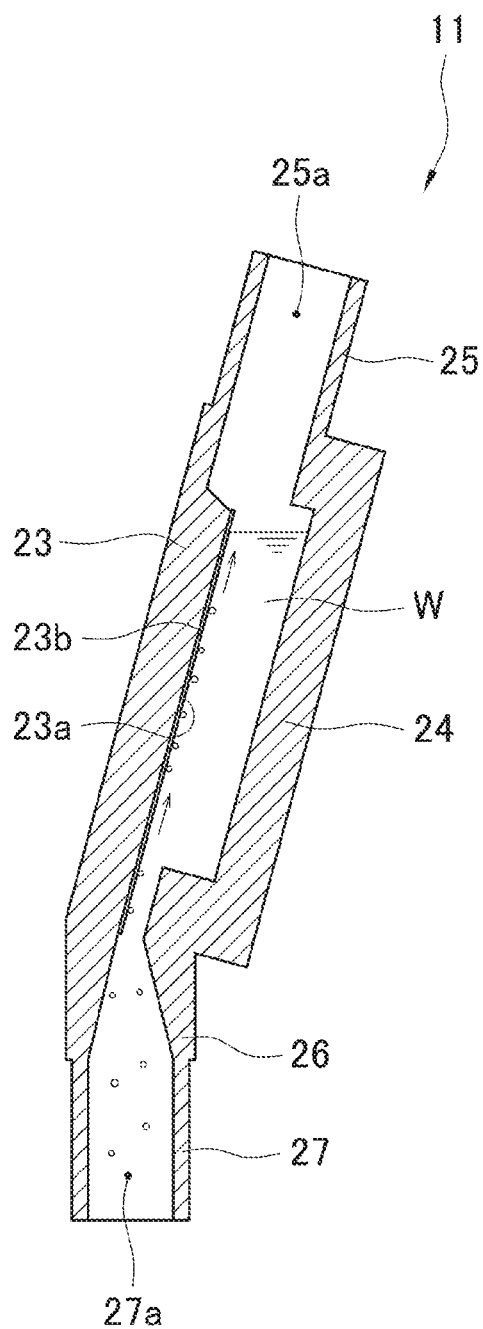
FIG. 3 is a cross-sectional view of the measurement chamber of FIG. 1 from a side surface direction.
Figure 4:
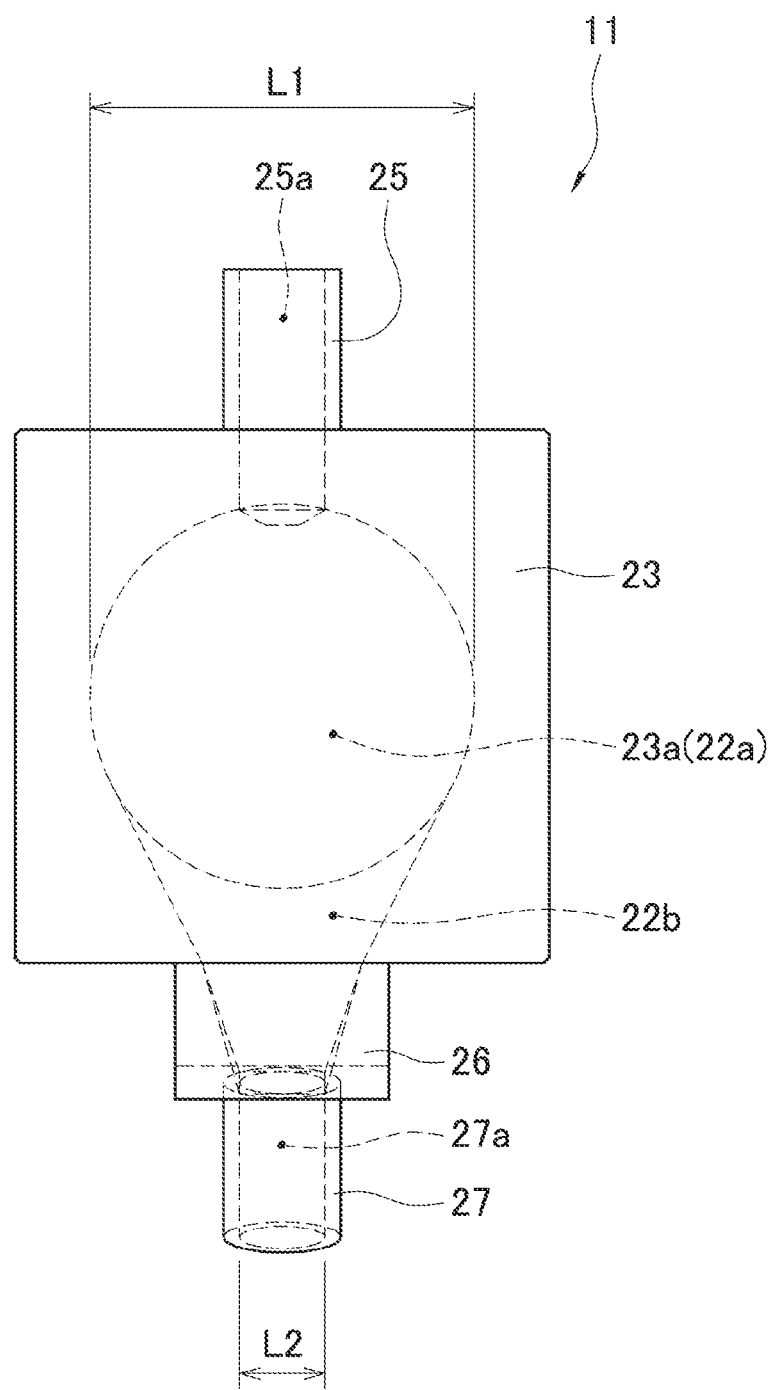
FIG. 4 is a drawing when a transparent inclined surface of the measurement chamber of FIG. 1 is viewed from a front.
Figure 5:
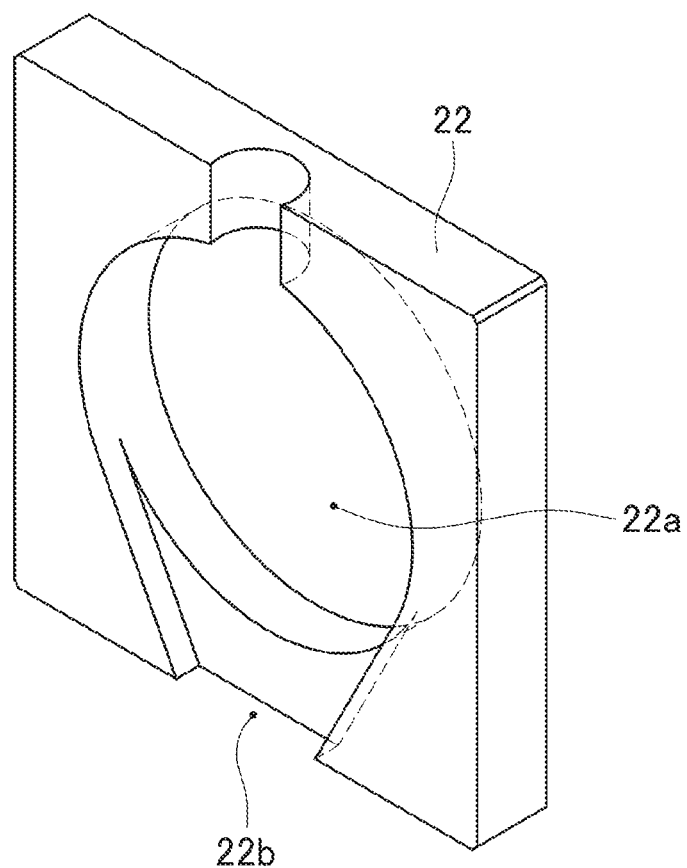
FIG. 5 is a perspective view of a main member constituting the measurement chamber of FIG. 1.

FIG. 1 illustrates a side view of the measurement chamber 11 constituting the air bubble measurement device 10 according to the first embodiment of the present invention, FIG. 3 illustrates a cross-sectional view of the measurement chamber 11 from a side surface direction, and FIG. 4 illustrates a drawing when a transparent inclined surface of the measurement chamber 11 is viewed from a front. FIG. 5 illustrates a perspective view of a main member 22 constituting the measurement chamber 11.

The measurement chamber 11 is made of a plurality of transparent members. A material of these members is vinyl chloride in this embodiment. As the material of the members, a member having high optical transmittance can be preferably used such that the light projected from the light projection device 13 transmits the measurement chamber 11 and allows the photographing device 12 to measure it. The members preferably have the optical transmittance of 80% or more in a visible light region at a wavelength of from 400 nm to 700 mm, and 90% or more is further preferred.

As examples of a member meeting the above-described optical property, a glass, acrylic, polyethylene terephthalate (PET), and polycarbonate can be used, in addition to vinyl chloride.

Since the vinyl chloride is low price and features high workability and high transparency, the vinyl chloride can be preferably used as the members of the measurement chamber 11. Since the acrylic has the transparency higher than that of the vinyl chloride, is less likely to be flawed, and exhibits a small decrease in degree of transparency, the acrylic can be preferably used in installation at a location where replacement is difficult to be performed.

The measurement chamber 11 includes the main ember 22 and a first lid member 23 and a second lid member 24 such that the main member 22 is sandwiched between them. An outer shape of the main member 22 is a quadrilateral plate shape with thickness, namely, a flat quadrangular prism shape. The main member 22 has a measurement hole 22a having a comparatively large diameter. The measurement hole 22a has an axial direction that matches a thickness direction of the thinnest thickness of the main member 22 having the quadrangular prism configuration (hereinafter, this direction may be referred to as a thickness direction of the main member 22). When the main member 22 is sandwiched between the first lid member 23 and the second lid member 24 so as to obstruct the measurement hole 22a, the measurement hole 22a part forms a space closed in the axial direction of the measurement hole 22a.

Here, in the space configured of the main member 22, the first lid member 23, and the second lid member 24, a surface on the right side of the first lid member 23 in FIG. 3 may be referred to as a transparent inclined surface. Additionally, in the transparent inclined surface, a part where the measurement hole 22a is positioned may be referred to as the measurement portion 23a. In this embodiment, a hydrophilic membrane 23b with a contact angle with water of 20 degrees or less is disposed on the transparent inclined surface to suppress an attachment of the air bubbles.

As long as the contact angle with water is 20 degrees or less and the optical transparency is provided, the hydrophilic membrane 23b is not specifically limited. For example, an organic material, such as acrylic resin, polyvinyl alcohol, polyethylene glycol, and celluloses having a hydrophilic group, an organic-inorganic hybrid material, such as acrylic silicone resin, and an inorganic material, such as a water glass (sodium silicate), titanium oxide, and silica, can be used. Especially, since a material containing titanium oxide exhibits superhydrophilicity through an action of a photocatalyst, the material is preferably used as the hydrophilic membrane 23b. While a thickness of the hydrophilic membrane 23b in this embodiment is 100 μm, the thickness of 20 μm or more and 500 μm or less allows providing a hydrophilic effect.

The measurement chamber 11 further includes an introduction port coupling member 26 disposed on a lower side of the main member 22, an introduction pipe 27 disposed on a further lower side of the introduction port coupling member 26, and a lead-out pipe 25 disposed on an upper side of the main member 22. Since the introduction port coupling member 26 has a through-hole and both of the introduction pipe 27 and the lead-out pipe 25 have a tubular structure, as illustrated in FIG. 3, the measurement chamber 11 communicates in the up-down direction through these members. As illustrated in FIG. 3, this communication allows holding the liquid W in the measurement chamber 11 and allows introducing the air bubbles in the liquid W from an introduction port 27a.

The introduction pipe 27 constituting the measurement chamber 11 is disposed such that an axis line of an inner surface of the pipe is in the vertical direction. Additionally, a top surface of the introduction port coupling member 26 coupled to the introduction pipe 27 is inclined by an inclination angle θ from the horizontal surface. By the inclination of the top surface of the introduction port coupling member 26 in this manner inclines the transparent inclined surface including the measurement portion 23a by the inclination angle θ from the vertical direction. That is, a normal line of the transparent inclined surface faces downward, and thus the transparent inclined surface has a posture of facing obliquely downward. The inclination angle θ is determined such that the transparent inclined surface is positioned at a position to which the air bubbles from the introduction port 27a move up. The inclination angle θ of this embodiment is 15 degrees.

As illustrated in FIG. 3, the transparent inclined surface being inclined at the inclination angle θ brings the air bubbles moving up in the liquid W into contact with the transparent inclined surface including the measurement portion 23a. When the air bubbles have a certain amount of size or more, the air bubbles move up as indicated by the arrows illustrated in FIG. 3 along this transparent inclined surface. By thus moving up the air bubbles, overlaps of the air bubbles can be reduced, and therefore the size and quantity of the air bubbles can be accurately measured. Note that the liquid containing the air bubbles hardly moves then.

A diameter L1 of the measurement hole 22a of the main member 22 constituting the air bubble measurement device 10 of this embodiment is longer than a diameter L2 of an inner surface of the introduction port 27a of the introduction pipe 27. Here, as illustrated in FIG. 4, the diameter L1 of the measurement hole 22a is a length in the lateral direction of the measurement portion 23a when the transparent inclined surface is viewed from the front.

As described above, the main member 22 has the measurement hole 22a and an enlarged communicating portion 22b that communicates between the measurement hole 22a and the introduction port 27a. As illustrated in FIG. 4, the enlarged communicating portion 22b has a groove shape. A length in the lateral direction of the groove part of the enlarged communicating portion 22b up to the measurement portion 23a becomes long at a constant proportion from the lower side to the upper side. A depth of the groove shape of the enlarged communicating portion 22b is a depth that is one third of a length in the thickness direction of the main member 22.

The air bubble measurement device 10 of this embodiment having the above-described configuration provides effects described in the following (1) to (3). (1) The hydrophilic membrane 23b having the contact angle with water of 20 degrees or less is disposed on the transparent inclined surface inside the measurement chamber 11. This allows reducing the attachment of the air bubbles on the transparent inclined surface even when the air bubbles become small. This allows reducing stay of the air bubbles on the transparent inclined surface and allows accurately measuring the states of the air bubbles, that is, the size and quantity of the air bubbles.

(2) The first lid member 23, which is the member constituting the transparent inclined surface, is made of vinyl chloride, and therefore production of the measurement chamber 11 while ensuring the transparency of the transparent inclined surface is easy. In view of this, a manufacturing cost of the air bubble measurement devices 10 can be reduced.

(3) Since the hydrophilic membrane 23b contains titanium oxide, the light irradiated when the state of the air bubbles is photographed provides an effect of a hydrophilic property of the photocatalyst, and thus the attachment of the air bubbles can be reduced.

(Method of using the Air Bubble Measurement Device 10 according to the First Embodiment)

The following describes the method of using the air bubble measurement device 10 according to the first embodiment using FIG. 2 and FIG. 3.

First, a user of the air bubble measurement device 10 determines the posture of the air bubble measurement device 10 such that the transparent inclined surface of the air bubble measurement device 10 becomes to have the predetermined inclination angle θ, that is, the axial center of the introduction pipe 27 becomes vertical. Then, the light projection device 13 and the photographing device 12 are prepared to ensure the measurement with the measurement portion 23a of the measurement chamber 11.

Next, the user of the air bubble measurement device 10 fills the inside of the measurement chamber 11 of the air bubble measurement device 10 with the liquid W from the lead-out pipe 25. In this respect, a lower end of the extension tube 14 is closed. Through this filling, the liquid W is introduced into the measurement chamber 11 and also into the extension tube 14, the introduction pipe 27, and the introduction port coupling member 26 (liquid introduction step). After the introduction, the lead-out pipe 25 is closed with a valve.

Next, the user of the air bubble measurement device 10 dips the air bubble extracting portion 15 in a container storing the liquid W (air bubble extracting portion dipping step). For example, as illustrated in FIG. 2, the user dips the air bubble extracting portion 15 at a predetermined position in the flotation tank 16 of the flotation machine.

Next, the dipped air bubble extracting portion 15 is opened. By opening the air bubble extracting portion 15, the air bubbles pass through in the liquid W filled in the air bubble extracting portion 15 or the like and are introduced to the measurement chamber 11 (air bubble introduction step).

The air bubbles introduced in the measurement chamber 11 contact the transparent inclined surface and move upward along this transparent inclined surface. Since the hydrophilic membrane 23b is disposed on the transparent inclined surface, the air bubbles move upward without attaching to the transparent inclined surface.

Next, the user of the air bubble measurement device 10 irradiates the measurement portion 23a with a light by the light projection device 13 and photographs the state of the measurement portion 23a by the photographing device 12 (air bubble photographing step). The size and quantity of the air bubbles are analyzed based on the photographed image, thereby ensuring correctly knowing the states of the air bubbles.

Second Embodiment

Figure 6:
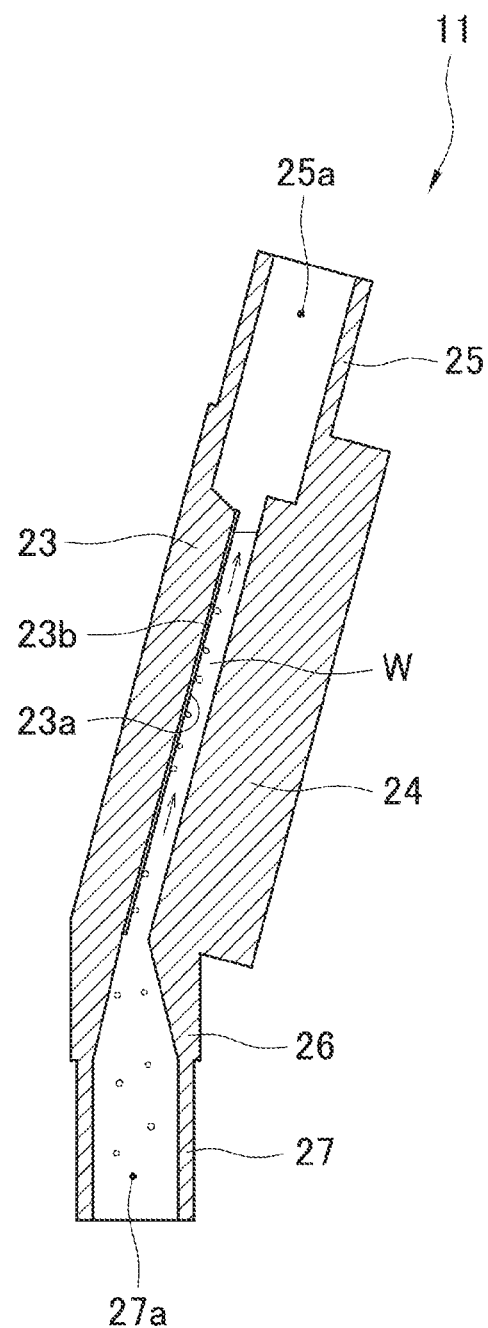
FIG. 6 is a cross-sectional view of a measurement chamber constituting an air bubble measurement device according to a second embodiment of the present invention from a side surface direction.

FIG. 6 illustrates a cross-sectional view of the measurement chamber 11 constituting the air bubble measurement device 10 according to the second embodiment of the present invention from a side surface direction. A difference between this embodiment and the first embodiment is that a distance between the first lid member 23 and the second lid member 24 at the measurement portion 23a is shorter than that of the first embodiment. That is, the second lid member 24 includes a columnar-shaped projecting portion fitting to the measurement hole 22a of the main member 22. Except that, the second embodiment is the same as the first embodiment. The optimal distance between the first lid member 23 and the second lid member 24 differs depending on the size of the observed air bubble. For example, when the size (diameter) of the air bubble is from 1 μm or more to 100 μm or less, the distance between the first lid member 23 and the second lid member 24 is preferably from 0.9 mm or more to 1.1 mm or less.

The distance between the first lid member 23 and the second lid member 24 of from 0.9 mm or more to 1.1 mm or less allows appropriately observing the air bubble with the size of from 1 μm or more to 100 μm or less.

Third Embodiment

Figure 7:
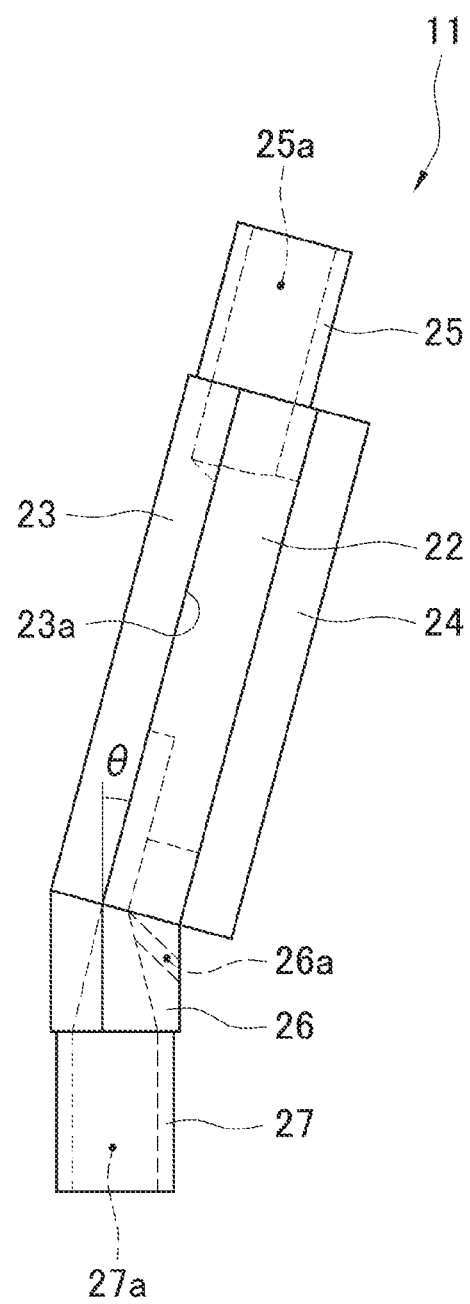
FIG. 7 is a side view of a measurement chamber constituting an air bubble measurement device according to a third embodiment of the present invention.
Figure 8:
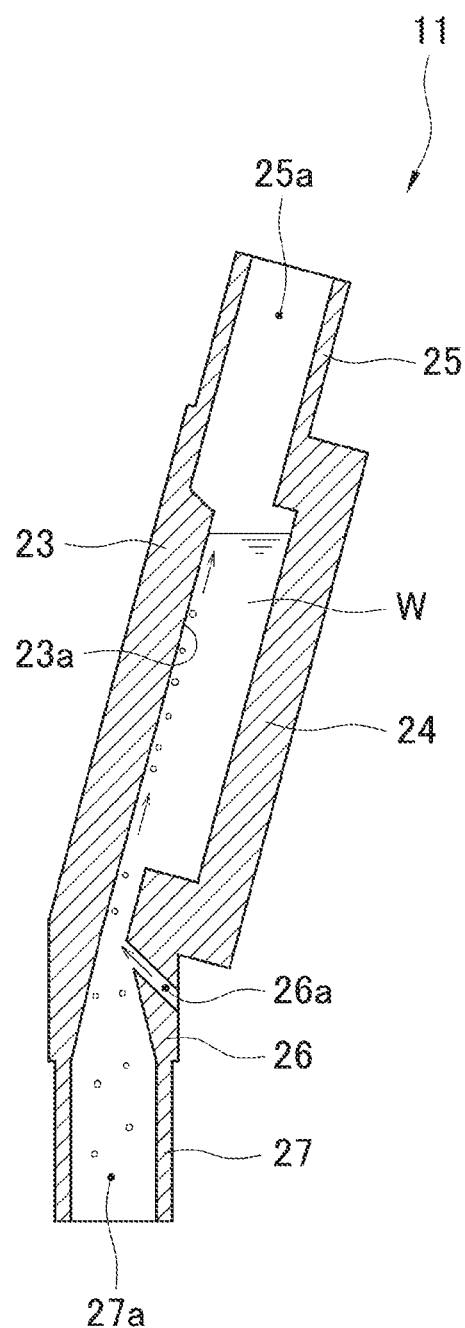
FIG. 8 is a cross-sectional view of the measurement chamber of FIG. 7 from a side surface direction.
Figure 9:
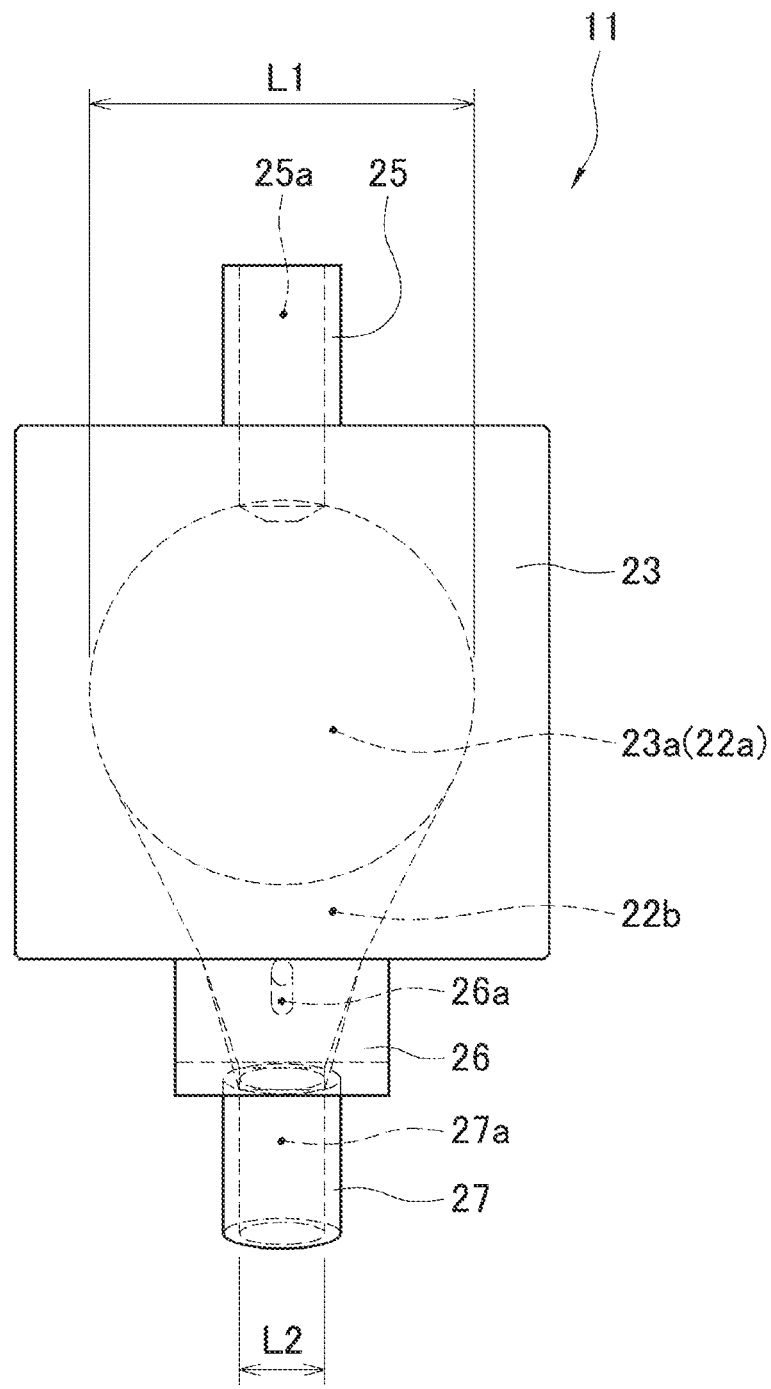
FIG. 9 is a drawing when a transparent inclined surface of the measurement chamber of FIG. 7 is viewed from a front.

FIG. 7 illustrates a side view of the measurement chamber 11 constituting the air bubble measurement device 10 according to the third embodiment of the present invention, FIG. 8 illustrates a cross-sectional view of this measurement chamber 11 from a side surface direction, and FIG. 9 illustrates a drawing when the transparent inclined surface of the measurement chamber 11 is viewed from a front. The air bubble measurement device 10 according to this embodiment has a basic configuration same as that of the air bubble measurement device 10 according to the first embodiment. Differences from the air bubble measurement device 10 of the first embodiment are that the hydrophilic membrane 23b is not used, and a first injection port 26a to inject an upward flow forming liquid to generate an upward flow from the lower side to the upper side along the transparent inclined surface is disposed. In the following description, the differences from the first embodiment will be described. Note that while the air bubble measurement device 10 according to the third embodiment having the configuration not using the hydrophilic membrane 23b will be described, the hydrophilic membrane 23b is used in some cases.

The air bubble measurement device 10 of this embodiment includes the first injection port 26a to inject the upward flow forming liquid to generate the upward flow from the lower side to the upper side along the transparent inclined surface in the measurement chamber 11. FIG. 8 indicates the flow of the upward flow by the arrows. It is necessary that the upward flow forming liquid is a liquid same as the transparent liquid filled in the measurement chamber 11 first and does not affect the size or the quantity of the air bubbles. For example, the liquid W in the flotation tank 16 can be used. One first injection port 26a is disposed in the introduction port coupling member 26 and the first injection port 26a is coupled to a pump (not illustrated), and the upward flow forming liquid is injected from this pump. An angle of the first injection port 26a with respect to the transparent inclined surface needs to be provided such that the upward flow can be smoothly formed. A flow speed of the upward flow along the transparent inclined surface is preferably faster than a rate of rise of the air bubbles from the introduction port 27a. Note that there may be a case where the upward flow forming liquid after being discharged from the measurement chamber 11 is accumulated in a tank and is supplied as the upward flow forming liquid again with the pump from a lower portion of the tank where the air bubbles are absent.

Similar to the first embodiment, the diameter L1 of the measurement hole 22a of the main member 22 constituting the air bubble measurement device 10 of this embodiment is longer than the diameter L2 of the inner surface of the introduction port 27a of the introduction pipe 27. Here, as illustrated in FIG. 9, the diameter L1 of the measurement hole 22a is a length in the lateral direction of the measurement portion 23a when the transparent inclined surface is viewed from the front.

Additionally, similar to the first embodiment, the main member 22 has the measurement hole 22a and the enlarged communicating portion 22b that communicates between the measurement hole 22a and the introduction port 27a as described above. As illustrated in FIG. 9, the enlarged communicating portion 22b has the groove shape. The length in the lateral direction of the move part of the enlarged communicating portion 22b up to the measurement portion 23a becomes long at the constant proportion from the lower side to the upper side. The depth of the groove shape of the enlarged communicating portion 22b is the depth that is one third of the length in the thickness direction of the main member 22.

The air bubble measurement device 10 of this embodiment having the above-described configuration provides effects described in the following (4) to (6).

(4) The first injection port 26a to inject the upward flow forming liquid to generate the upward flow from the lower side to the upper side along the transparent inclined surface is disposed. Accordingly, even when the air bubbles become small, the air bubbles can be carried away together with the upward flow, and therefore the states of the air bubbles, that is, the size and quantity of the air bubbles, can be accurately measured.

(5) The length in the lateral direction of the measurement portion 23a, which is a part of the transparent inclined surface, is longer than the length in the lateral direction of the inner surface of the introduction port 27a, and the large space is formed inside the measurement chamber 11. Accordingly, the air bubbles can disperse in the lateral direction, and this allows avoiding the overlaps of the air bubbles and allows further accurately measuring the states of the air bubbles.

(6) The length in the lateral direction of the enlarged communicating portion 22b up to the measurement portion 23a becomes long at the constant proportion from the lower side to the upper side. This further facilitates the dispersion of the air bubbles in the lateral direction.

(Method of using the Air Bubble Measurement Device 10 according to the Third Embodiment)

The method of using the air bubble measurement device 10 according to the third embodiment will be described. A difference from the method of using the air bubble measurement device 10 according to the first embodiment is that an upward flow injection step is performed after the air bubble introduction step. The point other than that is same as the case of the first embodiment. In the following description, the differences from the first embodiment will be described. Note that while the air bubble measurement device 10 according to the third embodiment having the configuration not using the hydrophilic membrane 23b will be described, the hydrophilic membrane 23b is used in some cases.

After the air bubble introduction step, the user of the air bubble measurement device 10 injects the upward flow forming liquid to generate the upward flow along the transparent inclined surface inside the measurement chamber 11 from the first injection port 26a (upward flow formation step). The upward flow forming liquid is injected from the first injection port 26a by operating the pump (not illustrated).

The air bubble measurement method including the liquid introduction step and the upward flow formation step that injects the upward flow forming liquid from the first injection port 26a allows the air bubbles to be carried away together with the upward flow even when the air bubbles become small, and therefore the states of the air bubbles can be accurately measured.

Note that although it has been described that the upward flow formation step is performed after the air bubble introduction step that introduces the air bubbles, the order of the steps is not limited to this order. For example, the upward flow formation step is performed first, and then the air bubble introduction step is performed in some cases.

Fourth Embodiment

Figure 10:
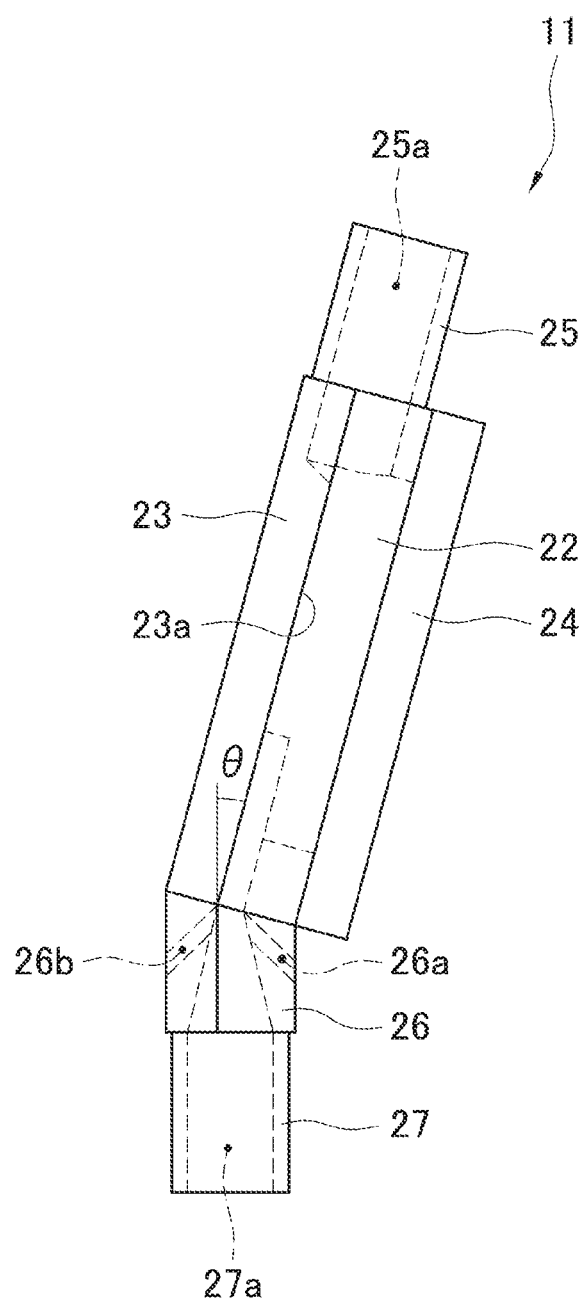
FIG. 10 is a side view of a measurement chamber constituting an air bubble measurement device according to a fourth embodiment of the present invention.
Figure 11:
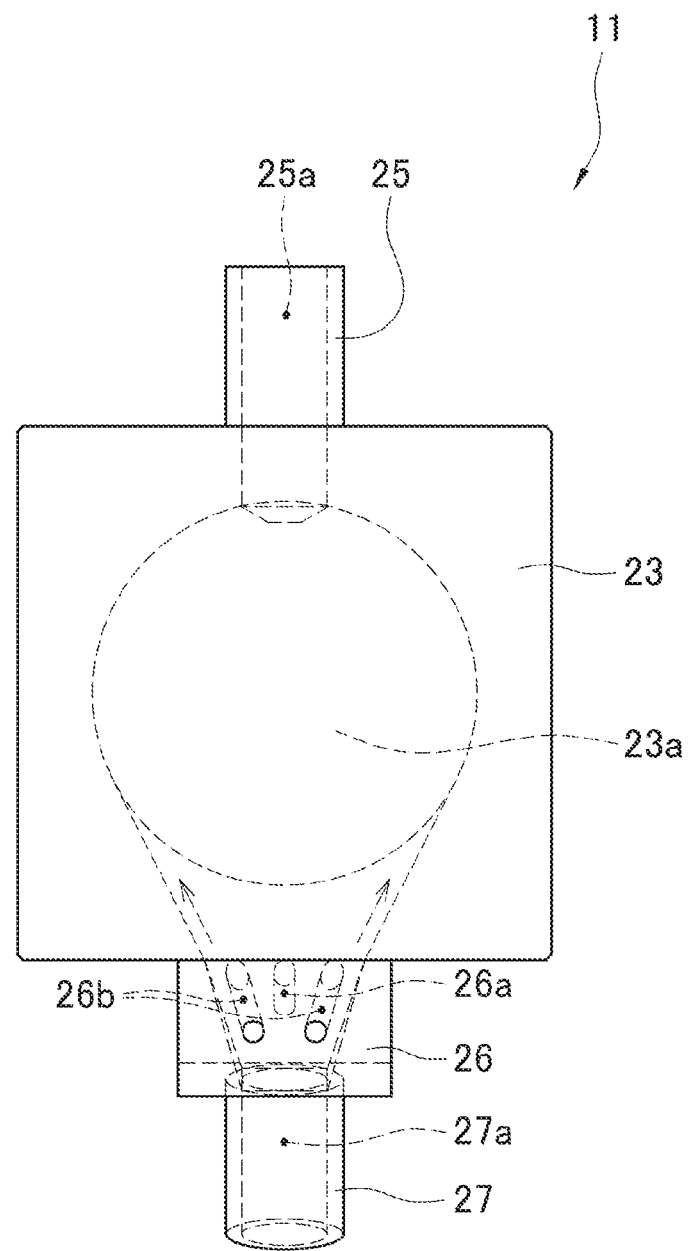
FIG. 11 is a drawing when the transparent inclined surface of the measurement chamber of FIG. 10 is viewed from a front.

FIG. 10 illustrates a side view of the measurement chamber 11 constituting the air bubble measurement device 10 according to the third embodiment of the present invention, and FIG. 11 illustrates a drawing when the transparent inclined surface of the measurement chamber 11 is viewed from the front. The air bubble measurement device 10 according to this embodiment has a basic configuration same as that of the air bubble measurement device 10 according to the first embodiment. A difference from the air bubble measurement device 10 of the second embodiment is that second injection ports 26b to inject an auxiliary flow forming liquid are disposed in the measurement chamber 11 of the air bubble measurement device 10. Note that FIG. 11 indicates the flow of an auxiliary flow by dotted arrows.

The auxiliary flow is formed at a part where a length in a lateral direction is enlarged of the enlarged communicating portion 22b where the groove is formed of the main member 22. The enlarged part is a surface perpendicular to the transparent inclined surface. The auxiliary flow is a flow from the lower side to the upper side, similar to the upward flow. The auxiliary flow is formed by the auxiliary flow forming liquid injected from the second injection ports 26b, which are disposed at two positions in the introduction port coupling member 26. It is necessary that the auxiliary flow forming liquid is a liquid same as the transparent liquid filled in the measurement chamber 11 first and does not affect the size or the quantity of the air bubbles. For example, the liquid W in the flotation tank 16 can be used. A flow speed of the auxiliary flow along the transparent inclined surface is preferably at least faster than a rate of rise of the air bubbles from the introduction port 27a, and is further preferably faster than the flow speed of the upward flow, for example, twice the flow speed of the upward flow. Note that, while the two second injection ports 26b are disposed in this embodiment, the second injection ports 26b are not especially limited to this, and one second injection port 26b is disposed in some cases. In this case, a configuration that separates the auxiliary flow forming liquid is disposed in the introduction port coupling member 26.

The air bubble measurement device 10 of this embodiment having the above-described configuration provides an effect described in (7). (7) The second injection ports 26b to introduce the auxiliary flow forming liquid to generate the auxiliary flow from the lower side to the upper side along the surface perpendicular to the transparent inclined surface are disposed, and the auxiliary flow has the flow speed faster than that of the upward flow. Accordingly, according to the Bernoulli's principle, a pressure around the auxiliary flow where the flow speed is large becomes lower than a pressure around the upward flow, and the dispersion of the air bubbles in the lateral direction is further facilitated.

(Method of using the Air Bubble Measurement Device 10 according to the Fourth Embodiment)

The method of using the air bubble measurement device 10 according to the fourth embodiment will be described. A difference from the method of using the air bubble measurement device 10 according to the third embodiment is that the auxiliary flow forming liquid is injected in the upward flow injection step.

When the upward flow forming liquid is injected from the first injection port 26a in the upward flow formation step, the user of the air bubble measurement device 10 injects the auxiliary flow forming liquid to generate the auxiliary flow from the lower side to the upper side along the surface perpendicular to the transparent inclined surface. The auxiliary flow forming liquid is injected from the second injection ports 26b by operating a pump (not illustrated). Note that, in this embodiment, the pump to inject the auxiliary flow forming liquid is different from the pump to inject the upward flow forming liquid. However, it is possible to perform the injection with the same pump by, for example, providing an orifice in the middle of an injection pipe. In this embodiment, while a timing of starting injecting the auxiliary flow forming liquid is same as a timing of starting injecting the upward flow forming liquid, the timings need not to be the same.

The upward flow injection step including the injection of the auxiliary flow forming liquid to generate the auxiliary flow from the lower side to the upper side along the surface perpendicular to the transparent inclined surface from the second injection ports 26b facilitates the dispersion of the air bubbles in the lateral direction and allows accurately measuring the states of the air bubbles.

Note that, in the air bubble measurement devices 10 according to the third embodiment and the fourth embodiment, the distance between the first lid member 23 and the second lid member 24 can be configured to be same as that of the air bubble measurement device 10 according to the first embodiment, or can be configured to be shorter than that of the first embodiment as described in the second embodiment.

INDUSTRIAL APPLICABILITY

While the example of the air bubble measurement device 10 according to the present invention used for the flotation machine has been described, the air bubble measurement device 10 according to the present invention can also be used for another device in which the air bubbles are generated.

REFERENCE SIGNS LIST

10 Air bubble measurement device
11 Measurement chamber
22 Main member
22b Enlarged communicating portion
23a Measurement portion
23b Hydrophilic membrane
26a First injection port
26b Second injection port
27a Introduction port
W Liquid
θ Inclination angle

The invention claimed is:

1. An air bubble measurement device that measures air bubbles moving in a liquid, the air bubble measurement device comprising
a measurement chamber that holds the liquid, wherein the measurement chamber includes:
an introduction port to introduce the air bubbles in the liquid from a lower side; and
a transparent inclined surface that faces obliquely downward and is disposed at a position to which the air bubbles present inside the liquid move up, and
the transparent inclined surface includes a hydrophilic membrane to reduce attachment of the air bubbles on the transparent inclined surface, and the hydrophilic membrane has a contact angle with water of 20 degrees or less.

2. The air bubble measurement device according to claim 1, wherein
a member constituting the transparent inclined surface is made of vinyl chloride.

3. The air bubble measurement device according to claim 1, wherein
the hydrophilic membrane contains titanium oxide.

4. An air bubble measurement device that measures air bubbles moving in a liquid, the air bubble measurement device comprising
a measurement chamber that holds the liquid, wherein the measurement chamber includes:
an introduction port to introduce the air bubbles in the liquid from a lower side;
a transparent inclined surface that faces obliquely downward and is disposed at a position to which the air bubbles present inside the liquid move up; and
a first injection port to inject an upward flow forming liquid to generate an upward flow from a lower side to an upper side along the transparent inclined surface,
the upward flow forming liquid is same as a liquid filled in the measurement chamber first, wherein
the air bubbles move up along the transparent inclined surface together with the upward flow.

5. The air bubble measurement device according to claim 4, wherein
in the measurement chamber, a length in a lateral direction of a measurement portion as a part of the transparent inclined surface is longer than a length in the lateral direction of an inner surface of the introduction port when the transparent inclined surface is viewed from a front.

6. The air bubble measurement device according to claim 5, wherein
when the transparent inclined surface is viewed from the front, a length in the lateral direction of an enlarged communicating portion up to the measurement portion becomes long at a constant proportion from a lower side to an upper side.

7. The air bubble measurement device according to claim 4, wherein
the measurement chamber includes a second injection port to inject an auxiliary flow forming liquid to generate an auxiliary flow from a lower side to an upper side along a surface perpendicular to the transparent inclined surface, and
the auxiliary flow has a flow speed faster than a flow speed of the upward flow.

8. The air bubble measurement device according to claim 4, comprising:
a light projection device configured to irradiate the transparent inclined surface with a light; and
a photographing device configured to photograph the transparent inclined surface irradiated with the light by the light projection device.

9. An air bubble measurement method comprising:
introducing a liquid in a measurement chamber;
dipping an air bubble extracting portion disposed on a lower side of the measurement chamber;
opening the air bubble extracting portion to introduce air bubbles; and
injecting an upward flow forming liquid to generate an upward flow along a transparent inclined surface inside the measurement chamber from a first injection port, wherein
the upward flow forming liquid is same as a liquid filled in the measurement chamber first.

10. The air bubble measurement method according to claim 9, wherein
the injecting includes injecting an auxiliary flow forming liquid to generate an auxiliary flow from a lower side to an upper side along a surface perpendicular to the transparent inclined surface from a second injection port when the upward flow forming liquid is injected from the first injection port.

11. The air bubble measurement method according to claim 9, further comprising
irradiating a measurement portion as a part of the transparent inclined surface with a light by a light projection device and photographing the measurement portion by a photographing device.

* * * * *